United States Patent
Hargreaves et al.

(10) Patent No.: US 11,580,619 B2
(45) Date of Patent: *Feb. 14, 2023

(54) METHOD OF MANAGING DISPLAY DATA

(71) Applicant: DISPLAYLINK (UK) LIMITED, Cambridge (GB)

(72) Inventors: David Hargreaves, Cambridge (GB); David Dunn, Cambridge (GB); Douglas Morse, Houghton (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,466

(22) Filed: Oct. 1, 2021

(65) Prior Publication Data

US 2022/0028036 A1    Jan. 27, 2022

Related U.S. Application Data

(63) Continuation of application No. 16/727,878, filed on Dec. 26, 2019, now Pat. No. 11,164,288.

(30) Foreign Application Priority Data

Jan. 4, 2019    (GB) ...................................... 1900136

(51) Int. Cl.
*G06T 3/40* (2006.01)
*G06F 3/14* (2006.01)

(52) U.S. Cl.
CPC .......... *G06T 3/4038* (2013.01); *G06F 3/1454* (2013.01)

(58) Field of Classification Search
None
See application file for complete search history.

(56) References Cited

U.S. PATENT DOCUMENTS

| 2005/0084158 A1 | 4/2005 | Yano |
| 2010/0088736 A1 | 4/2010 | Besen |
| 2012/0131219 A1 | 5/2012 | Brannon, Jr. |
| 2016/0269684 A1 | 9/2016 | Lim et al. |
| 2022/0159232 A1* | 5/2022 | Hur ...................... H04N 13/183 |

FOREIGN PATENT DOCUMENTS

JP    2000341587    12/2000

* cited by examiner

*Primary Examiner* — Yi Wang
(74) *Attorney, Agent, or Firm* — Paradice & Li LLP

(57) ABSTRACT

A compositor receives, from each of a plurality of originating devices, compressed and/or encrypted image data portions of a frame of image data, together with portion metadata for each of the compressed and/or encrypted image data portions. Frame metadata for the frame of image data. The compositor then composites the image data portions without decompressing and/or decrypting them, based on the portion and frame metadata, by generating composited frame metadata for the composited image frame and amending the portion metadata for each of the compressed and/or encrypted image data portions to indicate a location of the compressed and/or encrypted image data portions in the composited image frame. The compressed and/or encrypted image data portions, the composited frame metadata and the amended portion metadata are then transmitted by the compositor to a display control device.

20 Claims, 9 Drawing Sheets

METHOD OF MANAGING DISPLAY DATA

CROSS-REFERENCE TO RELATED APPLICATIONS

This application is a continuation of U.S. application Ser. No. 16/727,878 filed Dec. 26, 2019, entitled "METHOD OF MANAGING DISPLAY DATA," which claims priority and benefit to United Kingdom Patent Application No. 1900136.1 filed Jan. 4, 2019, entitled "A METHOD OF MANAGING DISPLAY DATA", which are hereby incorporated by reference in their entireties.

BACKGROUND

Display data is often generated at one device before being transmitted, for example, wirelessly, to another device where it is displayed to a user. Especially as video quality improves and therefore the volume of a frame of display data increases, it is becoming increasingly desirable to compress display data for transmission from the device where it is generated to the device where it is displayed.

At the same time, it is desirable in a collaborative setting such as a meeting room system to be able to show display input from multiple connected computing devices on a single display panel, which means that the input from the connected computing devices must be composited into a single frame or series of single frames. This introduces a number of problems, of which one is exacerbated by the compression of the display data.

Conventionally, in order to carry out composition into a single frame, a compositor must be able to access the raw display data to be composited. This means that in a collaborative system the data must either be transmitted uncompressed and then compressed after composition, if the compositor is to transmit compressed data, or must be decompressed, composited, and recompressed, introducing significant delay and inefficiency. Similar problems arise if data is encrypted, and it may be undesirable to allow an intermediate device such as a compositor to access unencrypted data. This currently makes it impossible to properly use encrypted data in such a system.

The methods and devices of the invention seek to solve or at least mitigate these problems.

SUMMARY

Accordingly, in one aspect, the invention provides a method of managing display data from a plurality of originating devices for display on a shared display, the method comprising:

receiving, at a compositor from each of the plurality of originating devices, compressed and/or encrypted image data portions of a frame of image data;

receiving, at the compositor from each of the plurality of originating devices, portion metadata for each of the compressed and/or encrypted image data portions indicating a location of the compressed and/or encrypted image data portions in the frame of image data from a particular originating device, a size of the compressed and/or encrypted image data portions, and compression and/or encryption parameters and/or protocols;

receiving, at the compositor from each of the plurality of originating devices, frame metadata for the frame of image data indicating a size of the frame of image data and a format of the frame of image data;

compositing, by the compositor, the compressed and/or encrypted image data portions without decompressing and/or decrypting the compressed and/or encrypted image data portions, based on the portion and frame metadata, by generating composited frame metadata for the composited image frame indicating a size of the composited image frame and a format of the composited image frame and amending the portion metadata for each of the compressed and/or encrypted image data portions from the plurality of originating devices to indicate a location of the compressed and/or encrypted image data portions in the composited image frame;

transmitting, by the compositor to a display control device, the compressed and/or encrypted image data portions without decompressing and/or decrypting the compressed and/or encrypted image data portions, the composited frame metadata and the amended portion metadata, including the location of the compressed and/or encrypted image data portions in the composited image frame, and the compression and/or encryption parameters and/or protocols.

In one embodiment, compositing comprises amending the portion metadata to indicate a different size of the compressed and/or encrypted image data portions in the composited image frame.

In embodiments, different image data portions may be compressed and/or encrypted using different compression and/or encryption parameters and/or protocols. The different image data portions may be from different ones of the plurality of originating devices or may be from a same originating device.

According to one embodiment, compositing comprises generating the composited frame metadata and amending the portion metadata so that the compressed and/or encrypted image data portions from each of the plurality of originating devices are arranged to maintain the frame of image data from each of the plurality of originating devices separately in the composited image frame.

Preferably, compositing comprises generating the composited frame metadata and amending the portion metadata so that the compressed and/or encrypted image data portions from each of the plurality of originating devices are arranged in a grid-like pattern in the composited image frame.

The compositing preferably comprises generating the composited frame metadata and amending the portion metadata so that the compressed and/or encrypted image data portions from each of the plurality of originating devices do not overlap in the composited image frame.

In an embodiment, the method further comprises receiving, by the compositor, instructions indicating where the frames of image data from different ones of the plurality of originating devices are to be arranged in the composited image frame, and wherein compositing comprises generating the composited frame metadata and amending the portion metadata so that the compressed and/or encrypted image data portions from each of the plurality of originating devices are arranged in the composited image frame according to the received instructions.

According to a second aspect, the invention provides a compositor configured to perform the method described above.

According to a third aspect, the invention provides a display system comprising:

a compositor as described above; and a display control device configured to receive from the compositor the compressed and/or encrypted image data portions, the composited frame metadata and the amended portion metadata, the display control device including a decompressing and/or decryption module configured to decompress and/or decrypt the compressed and/or encrypted image data portions based on the compression and/or encryption parameters and/or protocols, the display control device further being configured to send the decompressed and/or decrypted image data portions to a display device to display the decompressed and/or decrypted image data portions at locations according to the composited frame metadata and the amended portion metadata.

According to a further aspect, the invention provides a method of compressing and transmitting display data from two or more computing devices for display on one or more display panels, comprising:
1. Each computing device generates an initial frame of display data;
2. Each computing device compresses the initial frame of display data;
3. Each computing device transmits its compressed initial frame of display data to a compositor together with compression information;
4. The compositor composites the received initial frames of display data into one or more set(s) of remapped data without decompressing the image data, using metadata;
5. The compositor transmits the set(s) of remapped data to a decompressor, such set(s) of remapped data incorporating metadata and the compression information;
6. The decompressor uses the metadata and the compression information to decompress the image data contained in the remapped data, producing one or more final image(s); and
7. The decompressor sends the final image(s) to the display panel(s) for display.

This allows multiple computing devices to transmit compressed display data in order to create a combined display, while avoiding the need to decompress the received data prior to composition and recompress it afterwards, which otherwise adds to the time and computing effort required for composition. It also means that confidential data can be transmitted more securely, as only the computing device that produced it and the decompressor need to be able to decompress it.

Accordingly, for this purpose compression may also or instead mean encryption.

The computing devices may all compress their initial frames using the same compression algorithm, either with the same or different parameters, or may use different compression algorithms as appropriate to the different types of data. The type of compression used and appropriate parameters are then sent alongside the data as part of the compression information.

The metadata used by the compositor and the decompressor includes the locations of the different initial frames within the final image(s) in order to assist with composition and decompression.

The compositor may have an internal clock rate independent of the computing devices and produce remapped data according to that clock rate. This will take advantage of intelligence within the compositor in order to reduce the need for synchronisation of the clients, as well as further obfuscating the exact activity of the clients.

BRIEF DESCRIPTION OF THE DRAWINGS

Embodiments of the invention will now be more fully described, by way of example, with reference to the drawings, of which.

DETAILED DESCRIPTION OF THE DRAWINGS

For the purposes of this description, the following terms will be used:
Initial frame: The frame of display data produced by each computing device and transmitted to the compositor.
Remapped data: The display data and additional and modified metadata produced by the compositor and transmitted to the display control device.
Final image(s): The display data generated from the remapped data, which is/are displayed on the display device(s).

Figure 1:
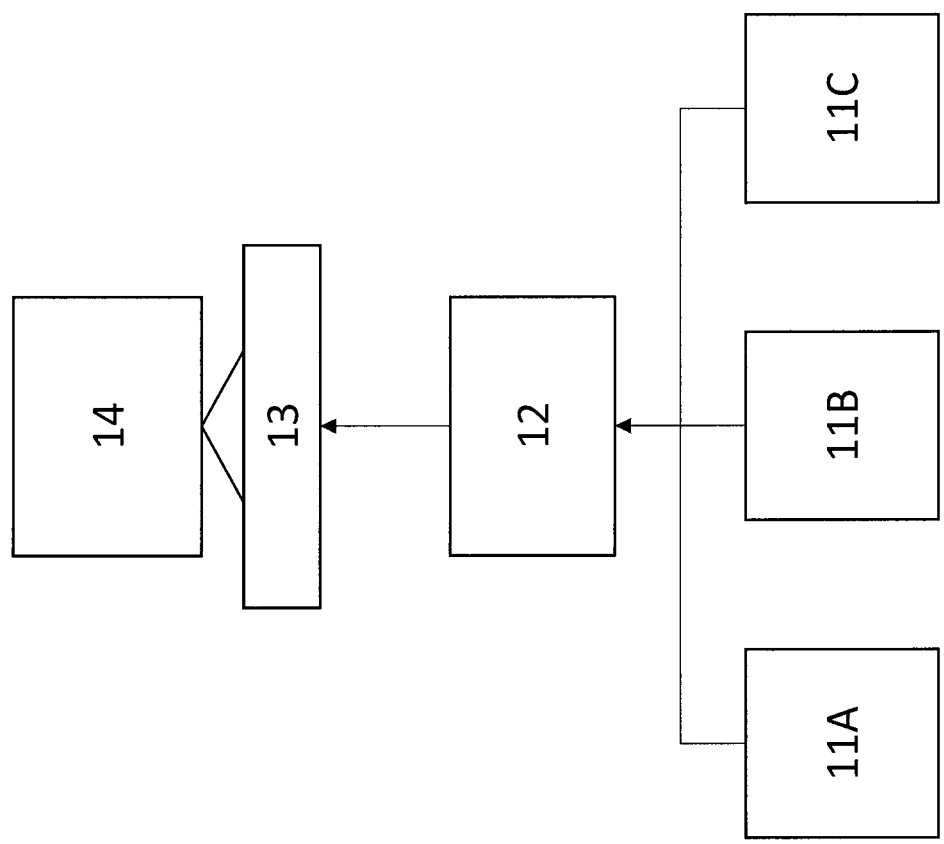
FIG. 1 shows a basic network topography.

FIG. 1 shows the architecture of a basic arrangement such as could be used for an embodiment of the invention. In this embodiment, three computing devices [11] are connected to a central compositor [12] and are able to transmit display data to it. They may also be able to transmit and/or receive other data such as audio data and user interaction data, for example touch information passed to them from a display device [14] if this has a touchscreen. For the purposes of this description, the main purpose of the compositor [12] is to composite frames of display data received from the computing devices [11] into frames for display on the display device [14].

The compositor [12] is in turn connected to a display control device [13], which receives the composited frames from the compositor [12] and prepares them for display on the display device [14], then passes them to the display device [14] for display.

The connections between the devices [11, 12, 13, 14] may be over any appropriate media: wired or wireless, and either local or across a network connection, including the interne.

Accordingly, the computing devices [11] may be remotely located compared to the compositor [12] and one another. Some devices [11, 12, 13, 14] may also be co-located such that they share a casing and appear to be a single device. For example, the display control device [13] may be built into the casing of a display device [14].

Figure 2:
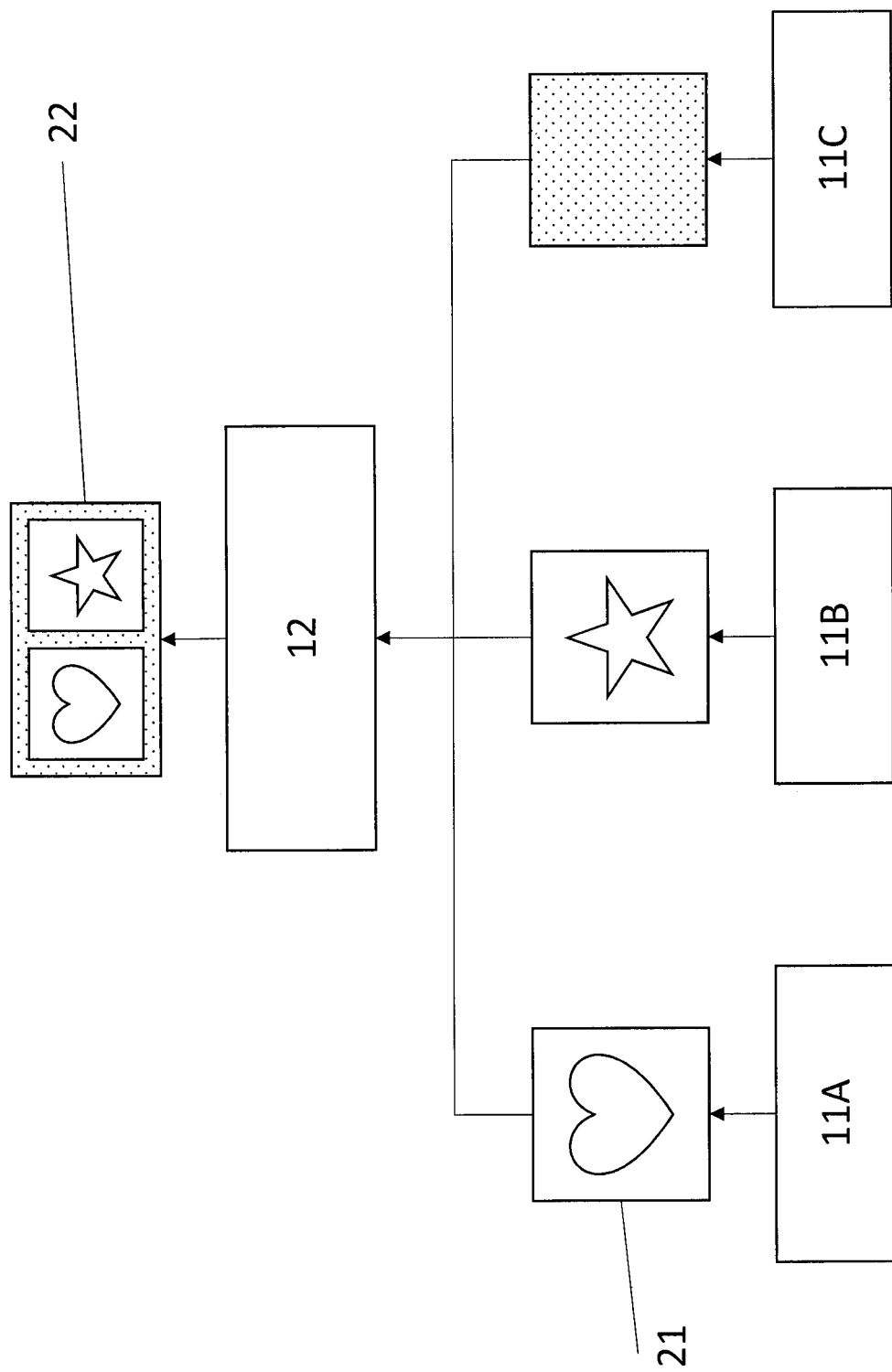
FIG. 2 shows the conventional transmission of frames of display data.

FIG. 2 shows a conventional transmission of frames of display data. In this example, the frames of display data produced by the computing devices [11] are not compressed at any point in the process. This may not desirable, however, especially where the computing devices [11] are not local to the compositor [12] or are transmitting data across a bandwidth-limited connection such as USB or a wireless connection, when it is preferable to compress the data in order to reduce its volume for transmission. Furthermore, where data is proprietary—for example, a clip from a film—it may be desirable to encrypt the data. Accordingly, for this purpose "compression" may include or be replaced by encryption.

Each computing device [11A, 11B, 11C] produces a frame of display data [21A, 21B, 21C] according to the operation of its internal programming, which may include user applications, an operating system, etc. In this example, the first computing device [11A] produces a frame of display data [21A] showing a heart, the second computing device [11B] produces a frame of display data [21B] showing a star, and the third computing device [11C] produces background data [21C], here shown as a plain field hatched with dots. In some embodiments, the computing device [11 C] which produces background data is built into the compositor [12], but it is shown separately here for clarity.

The three frames of display data [21] are transmitted to the compositor [12], which uses them to produce a single frame [22]—the final image—for display in accordance with instructions. This may involve applying transformations to the received data such as scaling the frames, overlapping them such that one frame is partially hidden, etc.; for example, here the frame [21C] produced by the third computing device [11C] is partially hidden by the frames [21A, 21B] produced by the other two computing devices [11A, 11B], which have themselves been scaled to fit within the final image [22].

In some embodiments, the initial frames [21] are compressed by the computing devices [11] prior to transmission to the compositor [12]. However, conventionally the compositor [12] must decompress them prior to composition in order to apply transformations and produce the final image [22], which it may then recompress prior to transmission. This repeated decompression and recompression is inefficient and results in wasted time and processing power. It also means that the compositor [12] will have access to the raw display data during the composition process, which in some cases may not be desirable, for example where the data is proprietary and the compositor [12] is not necessarily a trusted device.

Figure 3:
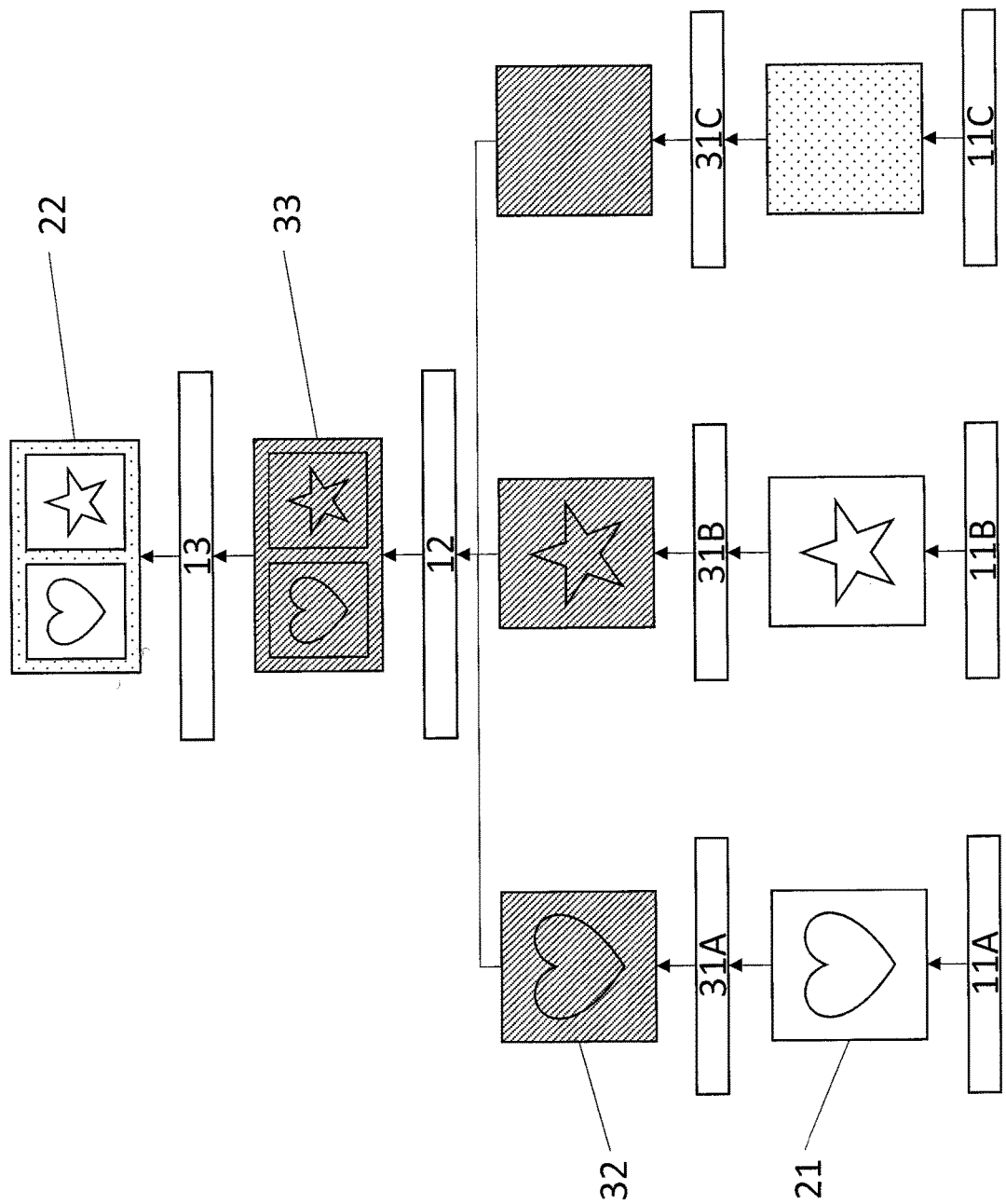
FIG. 3 shows the transmission of frames of display data according to an embodiment of the invention.

FIG. 3 shows a similar process of the transmission of frames of display data, but in this case the process is carried out according to an embodiment of the invention.

As described with reference to FIG. 2, the three computing devices [11A, 11B, 11C] each produce an initial frame [21A, 21B, 21C] in accordance with the operation of their internal programming. The initial frames [21] are then compressed [31] to produce compressed initial frames [32], and these are sent to the compositor [12] together with compression information [34]. This information may include details of the compression algorithm used, any key parameters such as the level of quantisation applied, etc.

The compressed initial frames [32] may also be accompanied by internal metadata [34]. This is especially important where a block-based encoding method has been used and the compressed initial frame [32] is or can be transmitted in parts rather than necessarily being transmitted in a continuous stream, since each part will have its own location within the initial frame [21/32], which will be sent to the compositor [12] as part of internal metadata [34].

The internal metadata [34] may also include the dimensions of each part of the compressed initial frame [32], and compression information [34] may also be transmitted on a per-part basis. Furthermore, the internal metadata [34] may include the dimensions and/or volume of data of the entire initial frame [21/32], its format, any buffer management in use, any update batching in use, and special settings for the decompressor [13], which may also or instead be included in the compression information [34].

Figure 4:
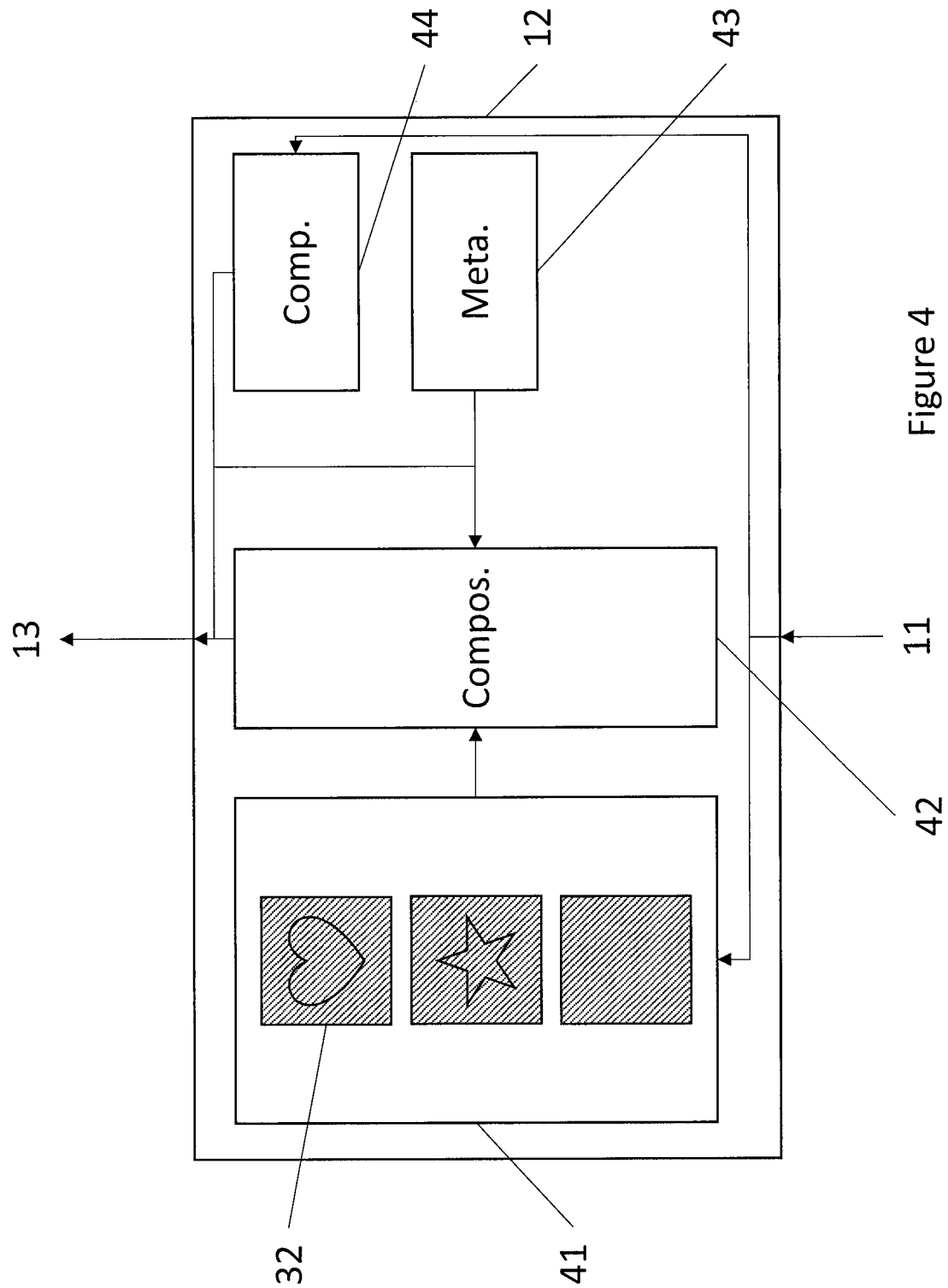
FIG. 4 shows a simplified block diagram of an example compositor.

The compressed initial frames [32] are received by the compositor [12], which according to the methods of the invention does not need to decompress them in order to generate remapped data [33/35] and thus ultimately a final image [22] but is able to composite them in their compressed form The internal workings of an example compositor [12] arranged according to the invention are shown in FIG. 4.

FIG. 4 shows a simplified block diagram of an example compositor [12]. Compressed initial frames [32] are received from the computing devices [11] along with compression information and possibly other metadata [34]. The compressed initial frames [32] are stored in a frame buffer [41] and the compression information [34] is stored in compression information storage [44]. Internal metadata [34] may also be stored in the compression information storage [44] or it may be stored in the frame buffer [41] with the compressed initial frames [32], for example such that a piece of internal metadata [34] is associated with each piece of compressed display data, or it may be stored in a separate memory not shown here. The frame buffer [41] is connected to a composition engine [42], an engine or processor arranged to amend metadata and display data as appropriate to carry out the methods of the invention. The composition engine [42] is also connected to metadata storage [43], which stores data such as the locations of the initial frame data relative to other initial frame data, as previously mentioned. There may also be conversion factors such as mappings to be used in determining how to convert internal metadata into overall metadata. For example, locations of parts of compressed initial frames [32] relative to the initial frames [12] must be converted into locations relative to the final image [22]. The composition engine [42] uses this information to create remapped data [33], comprising compressed image data [33] and metadata [35], without any need to access the raw data of the initial frames [21]. Naturally, the metadata in the metadata storage [43] can be modified by user interactions, such as instructions to change the locations in a final image [22] where the output from a particular computing device [11] should appear.

The metadata in the metadata storage [41] also includes ordering information. For example, this may indicate that as a general rule the initial frames [21A, 21B] for the first two computing devices [11A, 11B] should never overlap, but both appear on top of the initial frame [21C] from the third computing device [11C] and that if they do temporarily overlap, for example if a change in position is animated and one image is moving past the other, the image [21A] transmitted by the first computing device [11A] should appear "on top".

Furthermore, if the metadata in the metadata storage [41] includes mappings between locations in internal metadata [34] and locations in a final image [22], parts of the initial frames [21] may purposefully be relocated relative to one another in the final image [22] such that, for example, the left half of the initial frame [21A] from the first computing device [11A] might be located in the final image [22] on the left of the initial frame [21B] from the second computing device [11B] while the right-hand half is located on the right of the initial frame [21B] from the second computing device [11B].

The composition engine [42] uses the metadata in the metadata storage to amend any internal metadata in order to produce remapped data as described hereinafter in FIG. 5. It then transmits the compressed image data [33] from the compressed initial frames [32], the compression information

[34/35] received from the computing devices [11], and a copy of its own metadata or the amended versions of the internal metadata (in either case known simply as metadata [35]), together known as remapped data [33/35], to the display control device [13], which includes a decompressor.

This combination will enable the decompressor [13] to identify which parts of the image data in the remapped data [33] are associated with each computing device [11] and therefore decompress them correctly and display them in the correct locations in the final frame [22].

In addition to metadata generated from internal metadata—for example, the locations that were transmitted as part of the internal metadata overwritten by locations relative to the final image [22]—and/or metadata from the compositor [12] alone, depending on the exact embodiment, the metadata [35] may include:

Frame size
Frame format
Information on any update batching used, such as grouping of transmitted tiles and any dependencies between them, which may also be included in the compression information.
Any re-mapping that will be required of encoder and decoder resources, depending on the exact embodiment. This may also be added to the compression information Though this is not an exhaustive list and other metadata [35] may be included.

In either case, the decompressor [13] can use the metadata [35] to apply the correct decompression to the correct parts of the image data in the remapped data [33] in order to produce the final image [22], which can then be sent to the display device [14] for display.

This method works best where the compression algorithms used use block-based compression methods, whereby the initial frames [21] are divided into blocks or tiles for compression, as previously mentioned. In any case, the composition must take place along a grid of some sort in order to allow the composition engine [42] to carry out composition with no knowledge of the contents of the initial frames [21] and to allow the decompressor [13] to apply the correct decompression algorithms to the correct parts of the image data in the remapped data [33]. An example of such a grid is shown in FIG. 5, which shows remapped data [33/35] conceptualised as a larger version of the final image [22] shown in FIGS. 2 and 3.

This comprises the initial frame [21A] from the first computing device [11A] on the left, the initial frame [21B] from the second computing device [11B] on the right, and the display data from the initial frame [21C] from the third computing device [11C] used as background, appearing as a border around the other two images [21A. 21B]. This represents a conceptual combination of the image data [33] and location and compression metadata [35] comprising the remapped data [33/35], which in practice may be transmitted piecemeal and only fully assembled when the final image [22] is produced.

Figure 5:
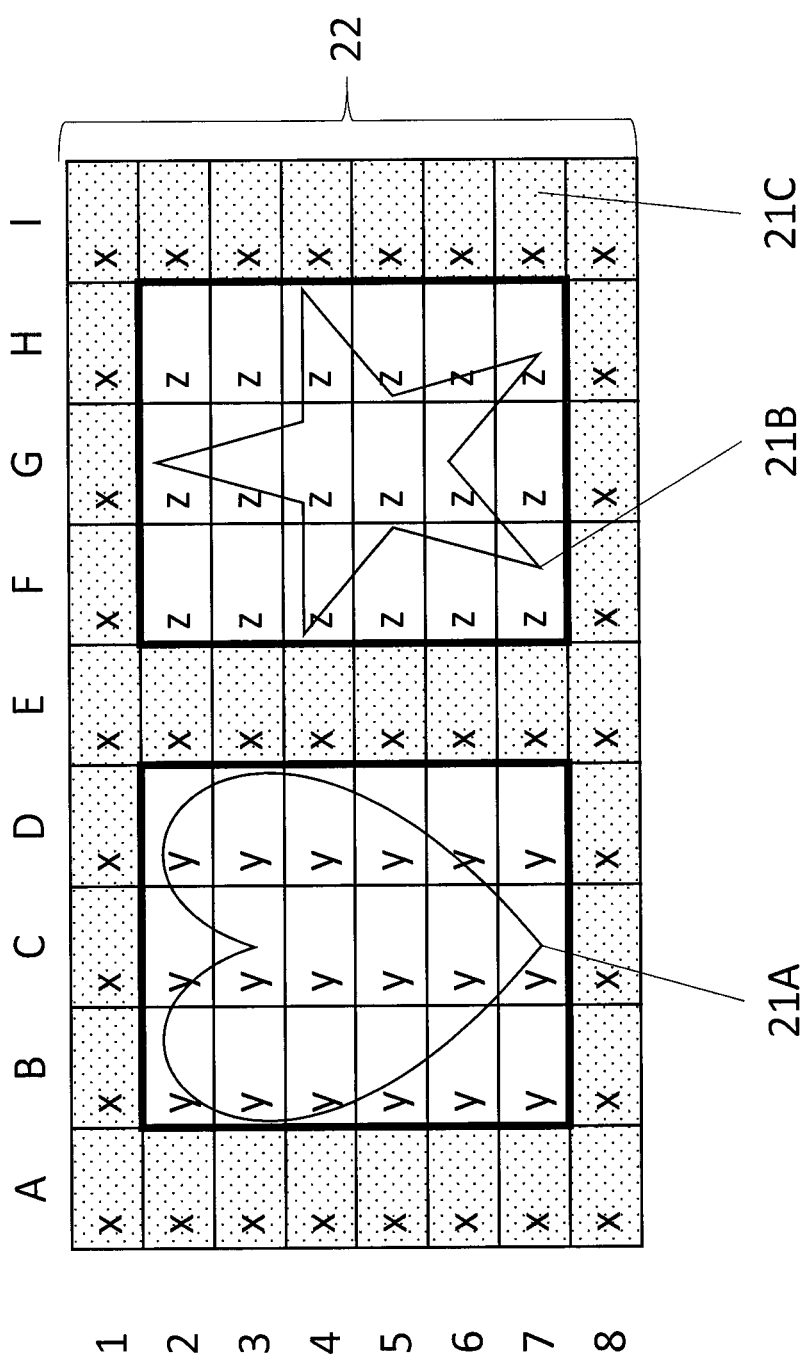
FIG. 5 shows a conceptual version of remapped data, rendered as the tile layout of an example frame.

The conceptual remapped data [51] is divided into a grid based on the size and shape of the final image [22] and when the composition engine [42] combined the compressed initial frames [32] to generate the remapped data [33] it lined the compressed initial frames [32] up with the grid, as shown in FIG. 5. This means that, in this example, the conceptual remapped data [51] has one grid box (columns A and I and rows 1 and 8) between the outside edge of the final image [22] and the edges of the initial frames [21A, 21B] from the first [11A] and second [11B] computing devices and a one grid box (column E) between the initial frames [21A, 21B] from the first [11A] and second [11B] computing devices, these grid boxes being where the display data in the initial frame [21C] from the third computing device [11C] is visible.

The blocks in the grid may correspond to blocks or tiles used in compression [31], or they may simply be treated as co-ordinates. Furthermore, while the grid blocks shown in the Figure are relatively large, this is for clarity only; they may be any arbitrary size or shape and may be individual pixels, depending on the size and shape of the final image [22] and the composition and compression algorithms in use.

The grid and the alignment of the compressed initial frames [32] within it will be included in the metadata [35] sent from the compositor [12] to the decompressor [13], and the decompressor [13] is therefore able to determine which chunks of the image data in the remapped data [33] correspond to which initial frame [21] even though the compositor [12] had no knowledge of the contents of the initial frames [21] and the image data in the remapped data [33] will be garbled by the compression applied. Accordingly, since the metadata [35] includes compression information, the decompressor [13] knows which decompression algorithms to use for different parts of the image data in the remapped data [33] and can therefore correctly decompress the entire final image [22]. In FIG. 5, this is shown by a letter notation such that x, y, and z indicate different compression algorithms or different parameters used by the same compression algorithm.

In this example, the first computing device [11A] compresses [31A] its initial frame [21A] using algorithm y. It then transmits the compressed initial frame [32A] to the compositor [12], together with "y" as the compression information [34A]. The second computing device [11B] compresses [31B] its initial frame [21B] using algorithm z and transmits it to the compositor [12] together with compression information "z" [34B], and the third computing device [11 C] compresses [31 C] its initial frame [21 C] using algorithm x and transmits it to the compositor [12] together with compression information "x" [34C]. The compressed initial frames [32] and the compression information [34] are stored in the frame buffer [41] and compression information storage [ 44] as previously described.

The composition engine [42] fetches metadata from the metadata storage [43] indicating that the initial frame [21A] from the first computing device [11A] should ultimately occupy a rectangle with the top left corner at B2 in the grid and the bottom right corner at D7 in the grid. It therefore fetches the compressed initial frame [32A] from the frame buffer [41], scales it as appropriate, and amends the metadata associated with each chunk of image data—in this example, a grid square—such that the initial frame [21A] will ultimately appear in that rectangle when the final image [22] is decompressed and displayed: for example, amending a co-ordinate A'1' indicating the top-left chunk in the compressed initial frame [32A] from the first computing device [11A] —a co-ordinate relative to that initial frame [21A/32A] only—to B2, a co-ordinate relative to the final image [22]. It does the same for the compressed initial frame [32B] from the second computing device [11B], placing it in a rectangle with the top left corner at F2 and the bottom right corner at H7. It then fills in columns A, E, and I and rows 1 and 8 with the contents of the compressed initial frame [32C] from the third computing device [11C] and transmits the image data

[33] together with the metadata it used, the amended metadata, and the compression information [35] to the decompressor [13].

The decompressor [13] receives the image data [33] and the compression information and metadata [35] from the compositor [12] and is able to determine from the metadata [35] that image data [33] which according to its associated metadata [35] will occupy the rectangle with its top left corner at B2 in the grid and its bottom right corner at D7 is compressed using compression algorithm y, image data [33] which according to its associated metadata [35] will occupy the rectangle with its top left corner at F2 and its bottom right corner at H7 is compressed using compression algorithm z and the remainder of the image data [33] is compressed with compression algorithm x. It is therefore able to apply the correct decompression to the correct parts of the image data in the remapped data [33] in order to produce the final image [22].

Figure 6:
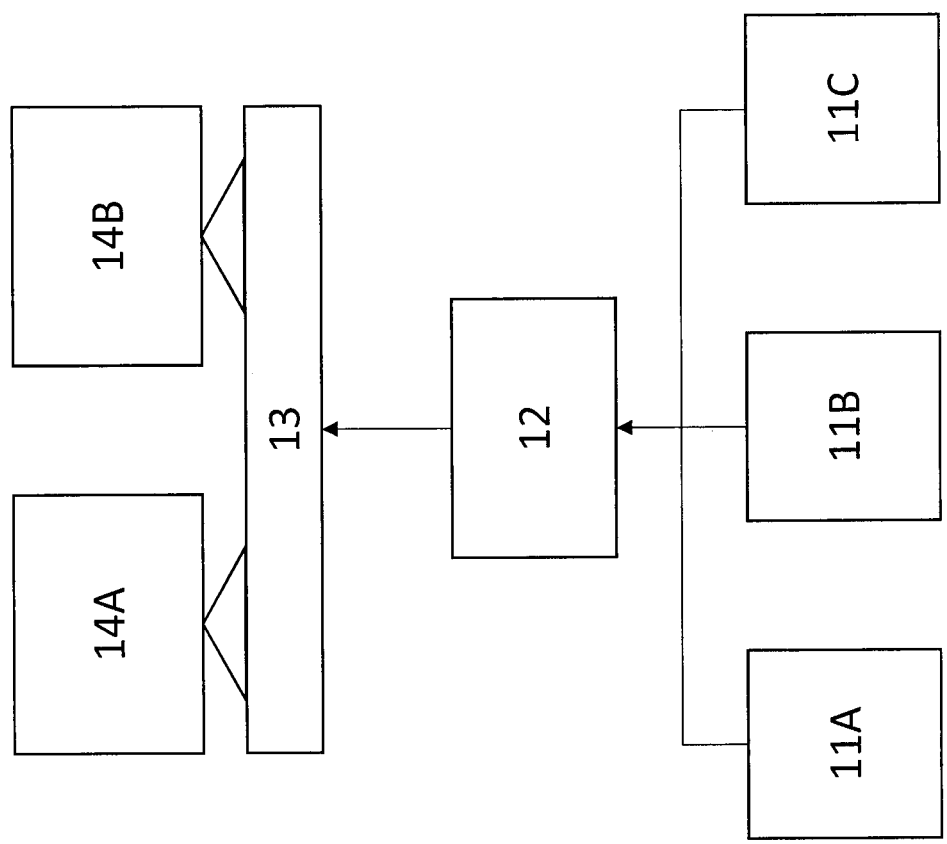
FIG. 6 shows a second basic network topography.

FIG. 6 shows an alternative network topography in which there are two display devices [14] connected to the display control device [13], which is in turn connected to a compositor [12] and thus three computing devices [11] as previously described. This version of the overall system will operate in a similar way to that shown in FIG. 1, as described with reference to FIG. 7.

Figure 7:
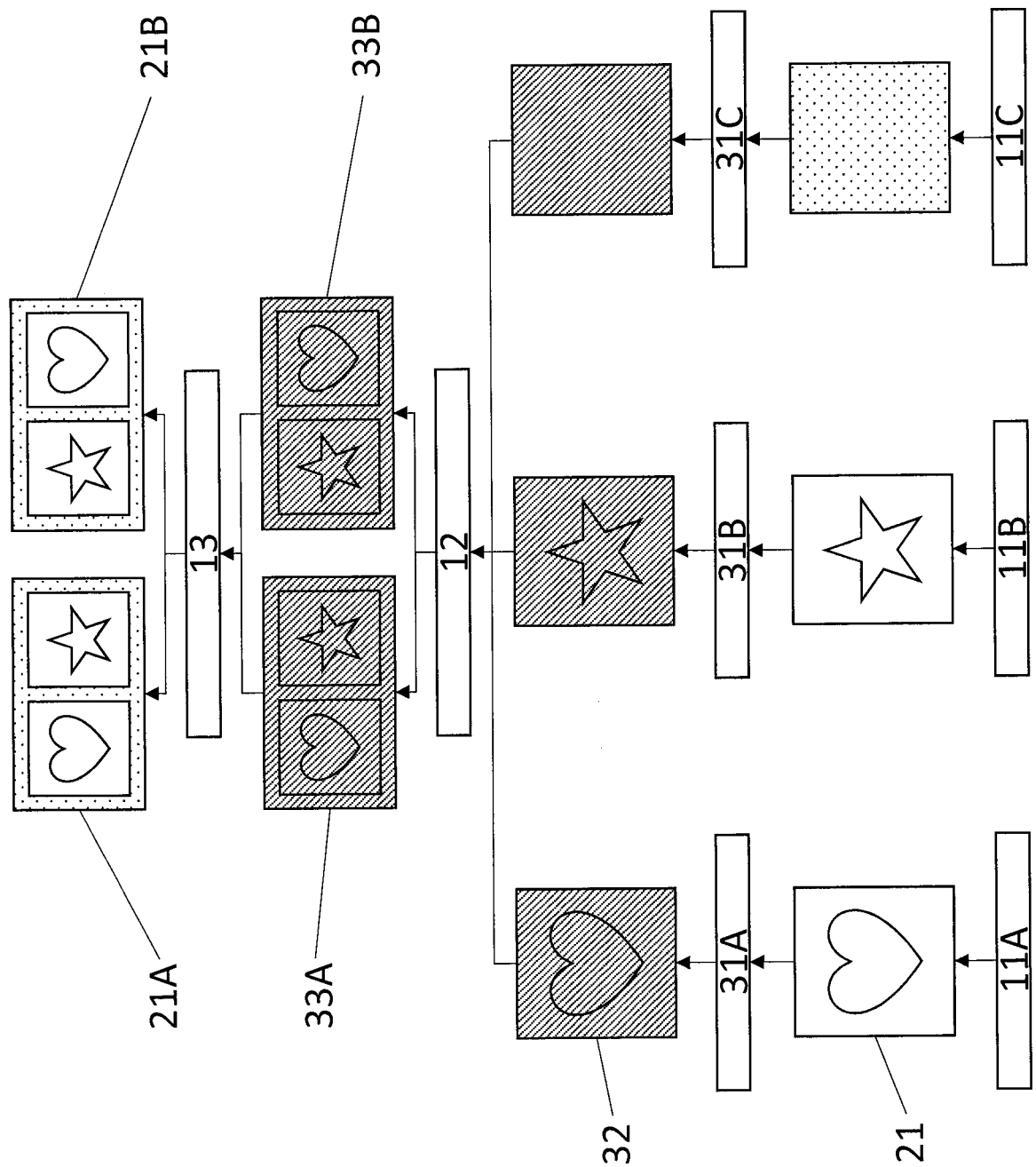
FIG. 7 shows the transmission of frames of display data according to a second embodiment of the invention.

FIG. 7 shows a similar view of the process to that shown in FIG. 3, in the network environment shown in FIG. 6. In this case, the two display devices [14A, 14B] show different final images [22A, 22B], composited from the same initial frames [21].

In order to achieve this result, the three computing devices [11] generate, compress [31], and transmit the same three initial frames [21], together with compression information and possibly internal metadata [34] as previously described, to the compositor [12]. However, the compositor [12] is arranged to generate two sets of remapped data [33/35] and therefore has two sets of metadata, one for each set of remapped data [33/35] to be generated. Where the display devices [14] have, for example, different sizes or resolutions the grids may also be different, thus requiring a different set of metadata to determine the locations of the different data. However, for simplicity they will be described herein as having the same layouts and grids.

In this example, the first final image [22A] is as described in FIG. 5. The second [22B] has the same layout, but the initial frames [21A, 21B] from the first [11A] and second [11B] computing devices are reversed such that the initial frame [21B] from the second computing device [11B] is on the left and the initial frame [21A] from the first computing device [11A] is on the right.

The composition engine [42] will therefore produce the first set of remapped data [33A/33B] as previously described with reference to FIG. 5 but will then fetch the second set of metadata for the second set of remapped data [33B/35B]. It will therefore amend the metadata of the compressed initial frame [32B] from the second computing device [11B] such that in the conceptual remapped data [51] shown in FIG. 5 it would appear in the rectangle with its top left corner at B2 in the grid and its bottom right corner at D7, while the compressed initial frame [32A] from the first computing device [11A] appears in the rectangle with its top left corner at F2 and its bottom right corner at H7 and the image data from the compressed initial frame [32C] from the third computing device [11C] appears in the remaining spaces. It then transmits the image data [33B] to the display control device [13] with the second set of metadata and the same set of compression information [35], though, naturally, linked to the second set of metadata such that the correct compression information is associated with the correct chunks of image data [33B] in the remapped data [33B/35B]. The metadata [35] in this case will also include an identification of the display device [14] on which each final image [22] is to be displayed.

The decompressor receives both sets of remapped data [33/35]. It then handles each set of remapped data [33/35] as previously described and sends the final images [22] for display on the display device [14] identified in the metadata [35].

The same methods can be used where the final images [22] are not the same size and shape, where they have drastically different layouts rather than identical layouts, and where the final images [22] do not all show the initial images [21] from all available computing devices [11].

Figure 8B:
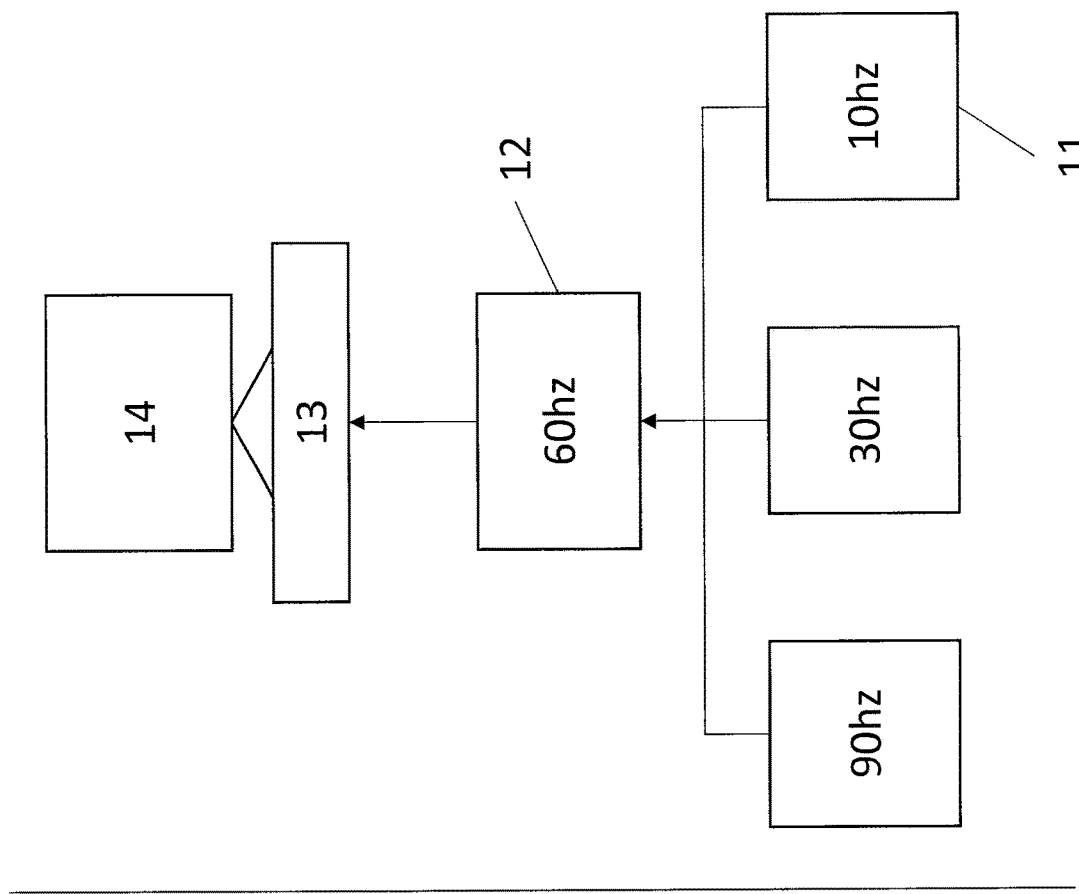
FIGS. 8a and 8b show the use of the invention for regulating update rates.
Figure 8A:
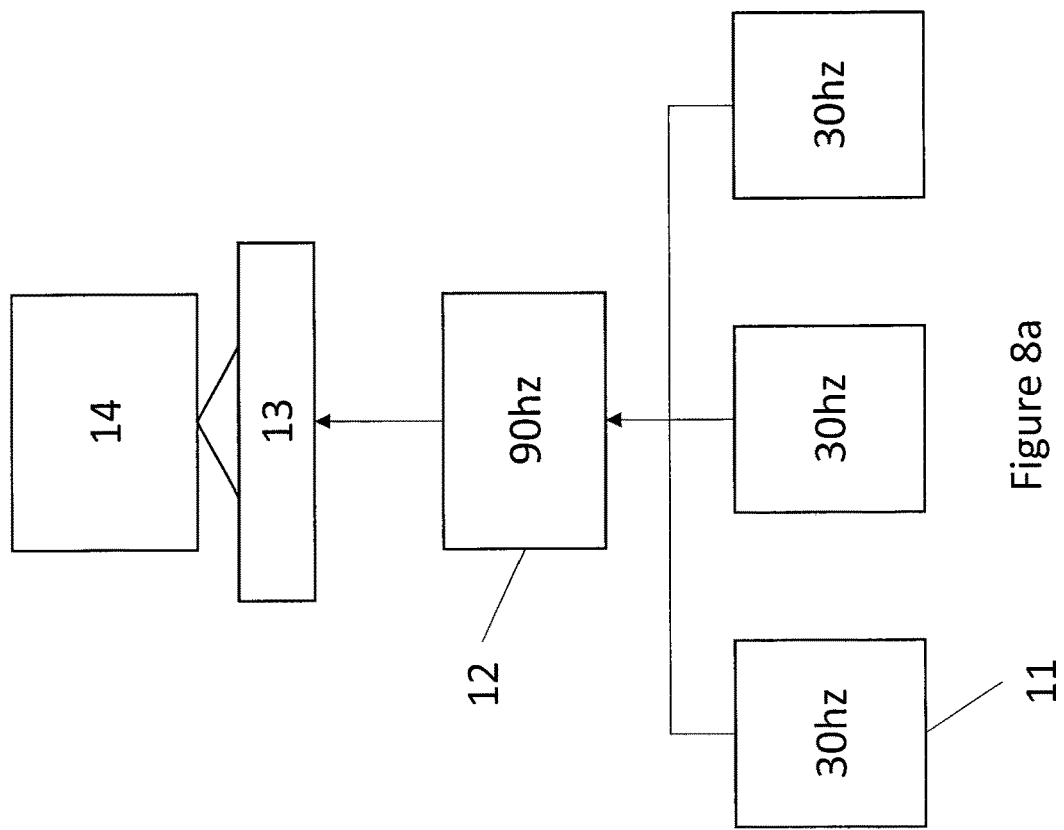

FIG. 8a shows a further application of the system according to an embodiment of the invention in regulating update rates. FIG. 8a shows a conventional system in which the rate at which the compositor [12] generates remapped data [33/35] is reliant on the rate at which the computing devices [11] generate initial frames [21], such that it generates updated remapped data [33/35] each time a computing device [11] generates an initial frame [21], resulting in a rate of 90 Hz from three connected computing devices [11] each with a rate of 30 Hz. This can result in inconveniently high frame rates and excessive network traffic, since the contents of the initial frames [21] may not have changed appreciably and in any case only one initial frame [21] may have changed at all. Conventionally, the only way to avoid this problem is to synchronise the clocks and therefore output rates of the computing devices [11], which is notoriously difficult.

FIG. 8b shows a system according to an embodiment of the invention in which the compositor [12] has no awareness of the contents of the initial frames [21] since they are received in a compressed form [32] and are not decompressed as part of the operation of the compositor [12]. In this system, the computing devices [11] can have different, arbitrary clock rates and output rates (in this example, the first computing device [11A] has a output rate of 90 Hz, the second computing device [11B] has an output rate of 30 Hz and the third computing device [11C] has an output rate of 10 Hz) but the compositor [12] has its own output rate (in this example, 60 Hz). Every time it generates remapped data [33/35], it simply consults the appropriate metadata and the stored compressed initial frames [32], regardless of when such initial frames [32] were last updated. This provides a further level of removal between the actual operation of the computing devices [11] and the display data they produce and the operation of the composition engine [42].

The initial frames [21] may not all be compressed [31] prior to composition and in some cases the composition engine [42] may compress the uncompressed data prior to transmitting the remapped data [33/35]. For example, if the third computing device [11C] is internal to the compositor [12] and only produces background data, this data may not be compressed when it is received by the composition engine [42]. Since the composition is independent of whether or how each initial frame [21] is compressed, the uncompressed data can be composited into the appropriate places in the grid as previously described and transmitted with null compression information or some other indication that it is not compressed, or it may be composited into the correct place and then compression applied to those parts of the combined frame [33/35] only. Naturally, the same applies to encryption or lack of encryption.

Figure 9:
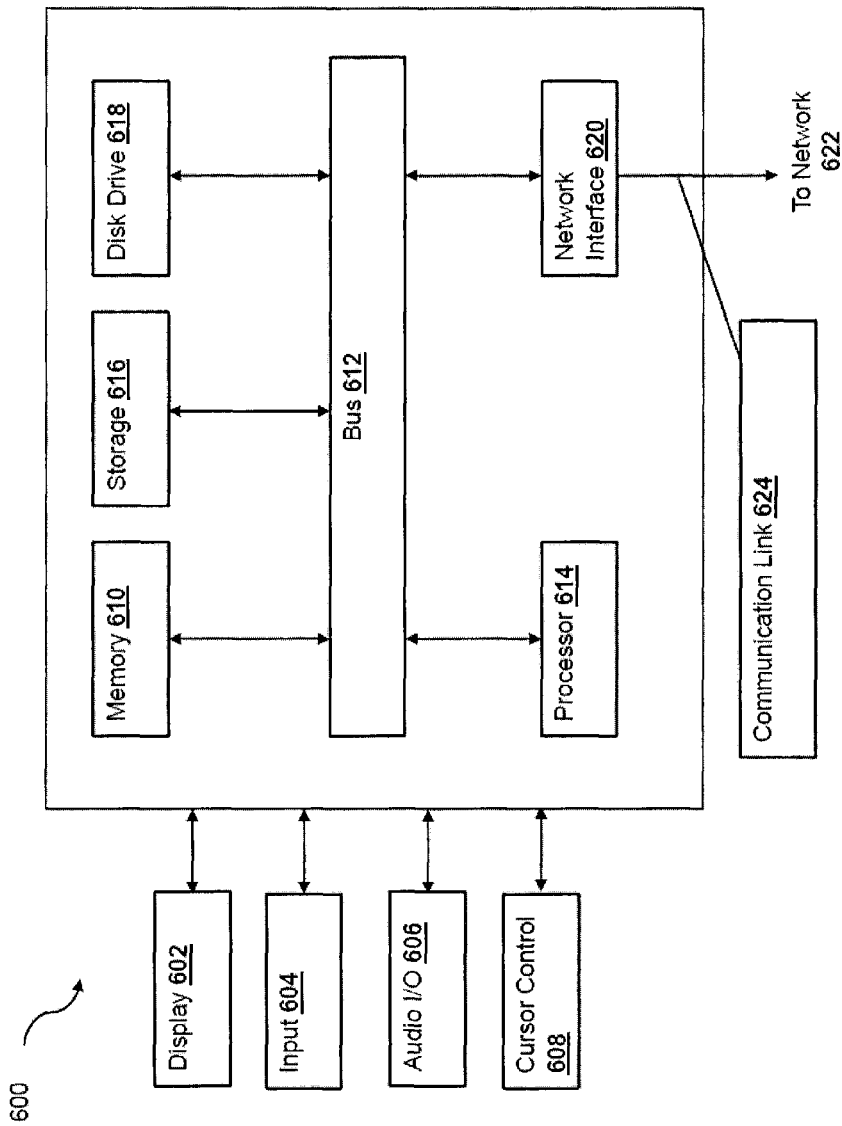
FIG. 9 is a block diagram of a computer system 600 suitable for implementing one or more embodiments of the present disclosure.

FIG. 9 is a block diagram of a computer system [600] suitable for implementing one or more embodiments of the present disclosure, including the computing devices [11], the central compositor [12], and the display control device [13]. Thus, it should be appreciated that the devices [11], [12], and [13] may be implemented as the computer system [600] in a manner as follows.

The computer system [600] includes a bus [612] or other communication mechanism for communicating information data, signals, and information between various components of the computer system [600]. The components include an input/output (I/O) component [604] that processes a user (i.e., sender, recipient, service provider) action, such as selecting keys from a keypad/keyboard, selecting one or more buttons or links, etc., and sends a corresponding signal to the bus [612]. The I/O component [604] may also include an output component, such as a display [602] and a cursor control [608] (such as a keyboard, keypad, mouse, etc.). The display [602] may be configured to present a login page for logging into a user account or a checkout page for purchasing an item from a merchant. An optional audio input/output component [606] may also be included to allow a user to use voice for inputting information by converting audio signals. The audio I/O component [606] may allow the user to hear audio. A transceiver or network interface [620] transmits and receives signals between the computer system [600] and other devices, such as another user device via network [622]. In one embodiment, the transmission is wireless, although other transmission mediums and methods may also be suitable. A processor [614], which can be a micro-controller, digital signal processor (DSP), or other processing component, processes these various signals, such as for display on the computer system [600] or transmission to other devices via a communication link [624]. The processor [614] may also control transmission of information, such as cookies or IP addresses, to other devices.

The components of the computer system [600] also include a system memory component [610] (e.g., RAM), a static storage component [616] (e.g., ROM), and/or a disk drive [618] (e.g., a solid-state drive, a hard drive). The computer system [600] performs specific operations by the processor [614] and other components by executing one or more sequences of instructions contained in the system memory component [610]. For example, the processor [614] can perform the functionalities described herein.

Logic may be encoded in a computer readable medium, which may refer to any medium that participates in providing instructions to the processor [614] for execution. Such a medium may take many forms, including but not limited to, non-volatile media, volatile media, and transmission media. In various implementations, non-volatile media includes optical or magnetic disks, volatile media includes dynamic memory, such as the system memory component [610], and transmission media includes coaxial cables, copper wire, and fiber optics, including wires that comprise the bus [612]. In one embodiment, the logic is encoded in non-transitory computer readable medium In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system [600]. In various other embodiments of the present disclosure, a plurality of computer systems [600] coupled by the communication link [624] to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into subcomponents comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed:

1. A method for displaying images on a shared display, the method comprising:
   receiving a plurality of frames of image data from a plurality of originating devices, respectively, each frame of the plurality of frames including one or more image data portions that are compressed in accordance with one or more compression algorithms and respective portion metadata associated with each of the compressed image data portions, the portion metadata associated with each compressed image data portion indicating a location of the compressed image data portion in relation to the frame;
   amending the portion metadata in each frame of the plurality of frames, without decompressing any of the compressed image data portions included in the frame, so that the portion metadata associated with each of the compressed image data portions indicates a pixel coordinate location of the compressed image data portion in a composited image frame, the composited image frame being a composite of the plurality of frames; and
transmitting, to the shared display, the one or more compressed image data portions included in each of the plurality of frames and the amended portion metadata associated with each of the compressed image data portions.

2. The method of claim 1, wherein the portion metadata associated with each compressed image data portion further indicates a size of the compressed image data portion and the amending of the portion metadata associated with each compressed image data portion changes the size of the compressed image data portion indicated by the portion metadata.

3. The method of claim 1, wherein the portion metadata and the amended portion metadata associated with each compressed image data portion further indicate one or more compression parameters or protocols associated with the compressed image data portion.

4. The method of claim 3, wherein the portion metadata and the amended portion metadata associated with different compressed image data portions indicate different compression parameters or protocols.

5. The method of claim 1, wherein the amending of the portion metadata comprises:
arranging the compressed image data portions so that each of the plurality of frames is separately represented in the composited image frame.

6. The method of claim 1, wherein the amending of the portion metadata comprises:
arranging the compressed image data portions in a grid-like pattern in the composited image frame.

7. The method of claim 1, wherein the amending of the portion metadata comprises:
arranging the compressed image data portions to not overlap in the composited image frame.

8. The method of claim 1, wherein the amending of the portion metadata comprises:
receiving instructions indicating an arrangement of the plurality of frames relative to the composited image frame; and
arranging the compressed image data portions in the composited image frame based on the received instructions.

9. The method of claim 1, wherein a rate at which the compressed image data portions are transmitted to the shared display is independent of any rates at which the compressed image data portions are received from the plurality of originating devices.

10. The method of claim 1, further comprising:
receiving one or more uncompressed image data portions; and
compositing the one or more uncompressed image data portions together with the compressed image data portions in the composited image frame without decompressing any of the compressed image data portions.

11. The method of claim 1, further comprising:
generating composited frame metadata indicating a size and format of the composited image frame; and
transmitting the composited frame metadata to the shared display.

12. The method of claim 11, wherein each of the plurality of frames further includes frame metadata indicating a size and format of the frame that is different than the size and format of the composited frame.

13. A system for displaying images on a shared display comprising:
one or more processors; and
a memory storing instructions that, when executed by the one or more processors, causes the system to:
receive a plurality of frames of image data from a plurality of originating devices, respectively, each frame of the plurality of frames including one or more image data portions that are compressed in accordance with one or more compression algorithms and respective portion metadata associated with each of the compressed image data portions, the portion metadata associated with each compressed image data portion indicating a location of the compressed image data portion in relation to the frame;
amend the portion metadata in each frame of the plurality of frames, without decompressing any of the compressed image data portions included in the frame, so that the portion metadata associated with each of the compressed image data portions indicates a pixel coordinate location of the compressed image data portion in a composited image frame, the composited image frame being a composite of the plurality of frames; and
transmit, to the shared display, the one or more compressed image data portions included in each of the plurality of frames and the amended portion metadata associated with each of the compressed image data portions.

14. The system of claim 13, wherein the portion metadata associated with each compressed image data portion further indicates a size of the compressed image data portion and the amending of the portion metadata associated with each compressed image data portion changes the size of the compressed image data portion indicated by the portion metadata.

15. The system of claim 13, wherein the portion metadata and the amended portion metadata associated with each compressed image data portion further indicate one or more compression parameters or protocols associated with the compressed image data portion.

16. The system of claim 13, wherein the amending of the portion metadata comprises:
receiving instructions indicating an arrangement of the plurality of frames relative to the composited image frame; and
arranging the compressed image data portions in the composited image frame based on the received instructions.

17. The system of claim 13, wherein a rate at which the compressed image data portions are transmitted to the shared display is independent of any rates at which the compressed image data portions are received from the plurality of originating devices.

18. The system of claim 13, wherein execution of the instructions further causes the system to:
receive one or more uncompressed image data portions; and
composite the one or more uncompressed image data portions together with the compressed image data portions in the composited image frame without decompressing any of the compressed image data portions.

19. The system of claim 13, wherein execution of the instructions further causes the system to:

generate composited frame metadata indicating a size and format of the composited image frame; and transmit the composited frame metadata to the shared display.

20. A system comprising:
a shared display;
a plurality of originating devices configured to output a plurality of frames of image data, respectively, for display on the shared display, each frame of the plurality of frames including one or more image data portions that are compressed in accordance with one or more compression algorithms and respective portion metadata associated with each of the compressed image data portions, the portion metadata associated with each compressed image data portion indicating a location of the compressed image data portion in relation to the frame; and
a compositor configured to:
  amend the portion metadata in each frame of the plurality of frames, without decompressing any of the compressed image data portions included in the frame, so that the portion metadata associated with each of the compressed image data portions indicates a pixel coordinate location of the compressed image data portion in a composited image frame, the composited image frame being a composite of the plurality of frames; and
  transmit, to the shared display, the one or more compressed image data portions included in each of the plurality of frames and the amended portion metadata associated with each of the compressed image data portions.

* * * * *